US010393361B1

(12) United States Patent
Pessenda

(10) Patent No.: US 10,393,361 B1
(45) Date of Patent: Aug. 27, 2019

(54) INDOOR/OUTDOOR GARDEN HOSE LAMP

(71) Applicant: Jodi Beth Pessenda, Delray Beach, FL (US)

(72) Inventor: Jodi Beth Pessenda, Delray Beach, FL (US)

( * ) Notice: Subject to any disclaimer, the term of this patent is extended or adjusted under 35 U.S.C. 154(b) by 0 days.

(21) Appl. No.: 16/124,598

(22) Filed: Sep. 7, 2018

(51) Int. Cl.
| | |
|---|---|
| *F21V 21/06* | (2006.01) |
| *F21V 31/00* | (2006.01) |
| *F21V 21/088* | (2006.01) |
| *F21V 23/04* | (2006.01) |
| *F21V 23/00* | (2015.01) |
| *F21S 9/03* | (2006.01) |
| *F21W 121/00* | (2006.01) |
| *F21W 131/109* | (2006.01) |

(52) U.S. Cl.
CPC .............. *F21V 31/00* (2013.01); *F21V 21/06* (2013.01); *F21V 21/088* (2013.01); *F21V 23/002* (2013.01); *F21V 23/04* (2013.01); *F21S 9/03* (2013.01); *F21W 2121/00* (2013.01); *F21W 2131/109* (2013.01)

(58) Field of Classification Search
CPC ........ F21V 31/00; F21V 23/002; F21V 21/06; F21V 21/088; F21V 23/04; F21W 2131/109; F21W 2121/00; F21S 9/03
See application file for complete search history.

(56) References Cited

U.S. PATENT DOCUMENTS

| | | | | |
|---|---|---|---|---|
| 2,309,772 | A * | 2/1943 | Manassc | B05B 15/625 248/82 |
| 3,304,038 | A * | 2/1967 | Guthrie | B05B 1/20 248/71 |
| 9,180,262 | B2 * | 11/2015 | Cota | A61B 90/30 |
| 9,265,312 | B2 * | 2/2016 | Chow | F21V 33/0004 |
| 9,266,138 | B1 * | 2/2016 | Massaro | B05B 15/62 |
| 2002/0131265 | A1 * | 9/2002 | Cilia | B05B 17/08 362/101 |
| 2005/0237742 | A1 * | 10/2005 | Wang | B05B 15/00 362/253 |
| 2009/0090404 | A1 * | 4/2009 | Kuelbs | A45B 3/00 135/16 |
| 2011/0050123 | A1 * | 3/2011 | Duerr | F21V 21/084 315/294 |
| 2012/0120630 | A1 * | 5/2012 | Liao | F21V 33/0064 362/96 |

FOREIGN PATENT DOCUMENTS

CA 2878627 A1 * 7/2015 ............... B05B 9/01

* cited by examiner

*Primary Examiner* — Donald L Raleigh
(74) *Attorney, Agent, or Firm* — Malin Haley DiMaggio & Bowen, P.A.

(57) ABSTRACT

An indoor/outdoor lamp that can be used outdoors in inclement weather having an exterior tubular body housing that is constructed from a conventional flexible garden hose. The lamp has an interior rigid vertical support member and a base member mounted inside said flexible conventional garden hose tubular housing to support the lamp above the ground or floor vertically. The lamp also has a light source fixture containing a light source, said light source fixture shaped like a garden hose manually actuated water spray nozzle emitting light through a clear cover. In an alternate embodiment, the lamp includes a manually actuated clamp at the free end for attachment to a conventional object.

10 Claims, 5 Drawing Sheets

INDOOR/OUTDOOR GARDEN HOSE LAMP

BACKGROUND OF THE INVENTION

1. Field of the Invention

This invention relates in general to an indoor/outdoor lamp including floor and task lamps for illuminating a surrounding area, and specifically to an indoor/outdoor lamp having a garden hose exterior housing, a light source mounted in an artificial water spray nozzle-like light fixture, and different electric power sources that can include an alternating current (AC) with a plug, batteries and/or solar power. The upright or clip-on lamp with a garden hose-like appearance is functional and decorative is protected against inclement weather and is used to illuminate a surrounding area outdoors and indoors.

2. Description of Related Art

Many homes, apartments, and even commercial buildings have surrounding spaces in areas such as yards and grounds that have many plants, gardens, and shrubs. It is desirable to illuminate such areas at nighttime for improved visibility and aesthetic effects and even to enhance walking at night. There are also domestic indoor areas such as indoor patios that include plants and flowers that can utilize a floor lamp and a task lamp for illumination.

One of the drawbacks of such outdoor lighting is that outdoor weather elements such as rain and fog can affect the electrical operation of an outdoor light and its vertical tubular support structure, often made of metal. Therefore, it is desirable to make sure that an outdoor light fixture can resist moisture and water and other outdoor conditions. However, using structural lamp items that can protect outdoor lighting from the elements may detract from the aesthetic appearance of the lamp, making it undesirable for use outdoors. Also there are indoor aesthetic considerations in some areas of a residence such as an indoor patio in the use of floor and task lamps.

The lamp described in this invention provides suitable illumination in some types of inclement weather and at the same time presents an aesthetic appearance that actually blends into the outdoor garden areas and indoor patios by virtue of its rugged outdoor structure and garden hose appearance.

SUMMARY OF THE INVENTION

An indoor/outdoor lamp having a garden hose exterior appearance comprising an exterior body constructed from a conventional garden hose, a rigid or flexible goose-neck internal support element, such as a rod or tube, sized in diameter to fit inside the conventional garden hose exterior body, is used to vertically support the lamp in an upright position as a floor lamp or clip-on lamp. A light source is mounted in a light source fixture that is threadably connected to one end of said garden hose exterior body. The light source fixture is constructed to look like a housing, shaped like a hand-actuated water spray nozzle, with fastener thread members attachable to the garden hose lamp exterior body at one end. The light source fixture housing also includes a plastic or glass transparent cover to provide for the emission of light and to provide an on/off electrical switch for the light source.

Inside the light fixture housing is mounted a conventional light source such as an incandescent bulb or light emitting diodes (LEDs).

The electrical power source for the light source can be from conventional 120 Volt (V) alternating current (AC) with a plug and direct current (DC) battery power, with or without a solar panel when used outdoors.

The lamp exterior body in one embodiment can be made with a conventional garden hose constructed of vinyl, plastic, or rubber as a water resistant tube. A typical garden hose structure will not stand by itself vertically but is quite flexible and therefore requires an internal support member, especially with a floor lamp for vertical suspension. The lamp exterior body being a water resistant tube is large enough in diameter to receive a smaller, thinner rigid rod, pipe or tube that extends within the lamp exterior body of sufficient length to be used to both vertically support the lamp light source above the ground and can also be used to form a sturdy lamp support base that contacts the ground (or floor). The lamp base preferably can be in a circular shape. This embodiment is for a floor lamp, both indoor and outdoor.

The garden hose exterior body protects the interior support rod, tube, and electrical wires inside of the exterior body from external conditions of moisture, rain, or other detrimental elements.

In an alternate embodiment, the lamp can include a manually operated clamp at one end for attachment to a variety of different objects as a light source, both indoors and outdoors.

The light source fixture includes a housing that is a plastic or metal, water resistant structure, aesthetically-shaped as a water spray nozzle, that can attach by male and female threaded fasteners directly to a garden hose threaded end fitting. The lamp fixture housing is also designed and constructed to have a light source switch for turning the light source on and off. A variety of light source switches can be provided in the spray nozzle-shaped light fixture housing.

It is an object of this invention to provide an indoor/outdoor lamp that looks like a garden hose and handheld water spray nozzle.

Light emitting diodes have become a desirable light source for domestic use indoors and outdoors because of their endurance and low power usage. The LED lighting elements come in different forms and structures.

DESCRIPTION OF A PREFERRED EMBODIMENT OF THE INVENTION

Figure 1:
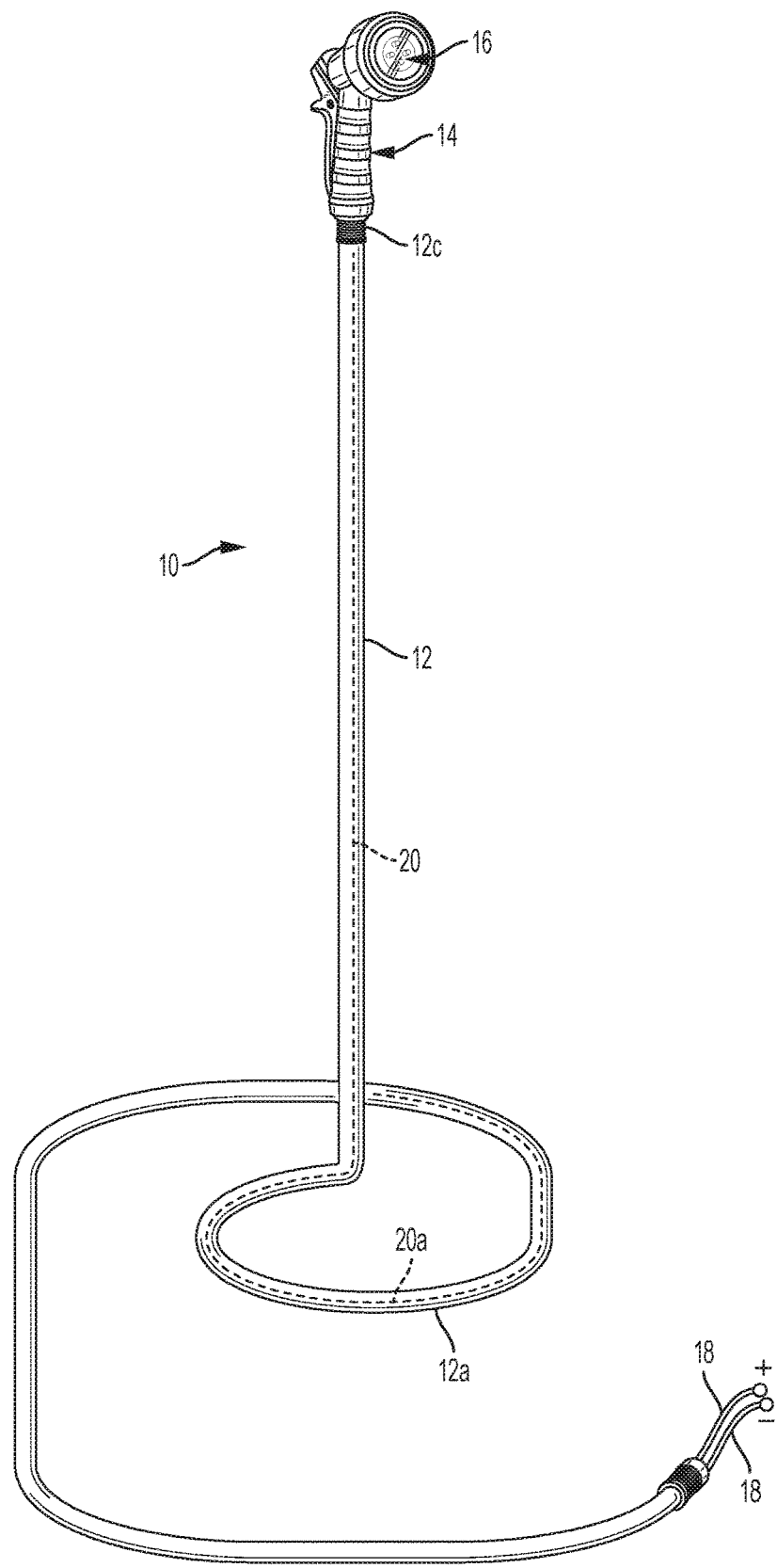
FIG. 1 shows a perspective view of a floor lamp as one embodiment of the invention.

Referring now to the drawings, and in particular FIG. 1, indoor/outdoor garden hose lamp 10 is a floor lamp comprised of a garden hose exterior body 12 that can be made of plastic, vinyl, or rubber and that is of a conventional garden hose construction. The lamp 10 has a rigid interior vertical support element 20 (shown as a dotted line in FIG. 1) mounted inside of the garden hose exterior body 12 for vertical support of the garden hose exterior body 12. A lower portion of the vertical support element 20 has been pre-shaped into a semi-circle and also a 90° angle for vertical support so that the entire lamp 10 is supported on the ground (or floor) by the base 12a and interior base support element 20a inside the garden hose exterior body 12. The interior vertical support element 20 can be made of metal or rigid plastic, provided that element is strong enough as a rod or tube or pipe to support the entire floor lamp 10 vertically above the ground or floor.

The lamp 10 also includes a light source 16 and a light source fixture 14 that is shaped like an outdoor garden hose water spray nozzle. A pair of electrical wires 18 can be attached using a plug to an AC 120 V power source or could be attached to a solar panel or could be attached to a battery in order to power light source 16. The floor lamp embodiment shown in FIG. 1 can be used indoors or outdoors as desired.

The importance of the garden hose exterior body 12 is that garden hose material protects the interior support element 20 and any electrical wires 18 that are inside the garden hose exterior structure even though the lamp may be disposed in outdoor inclement weather.

The light source fixture 14 also is water resistant and is attached by male and female threaded fasteners 12c which can be screwed onto the end of the garden hose exterior body 12. This also provides for water resistant protection of the light source 16 in the light source fixture 14 that is shaped like a manual water spray nozzle.

Figure 2:
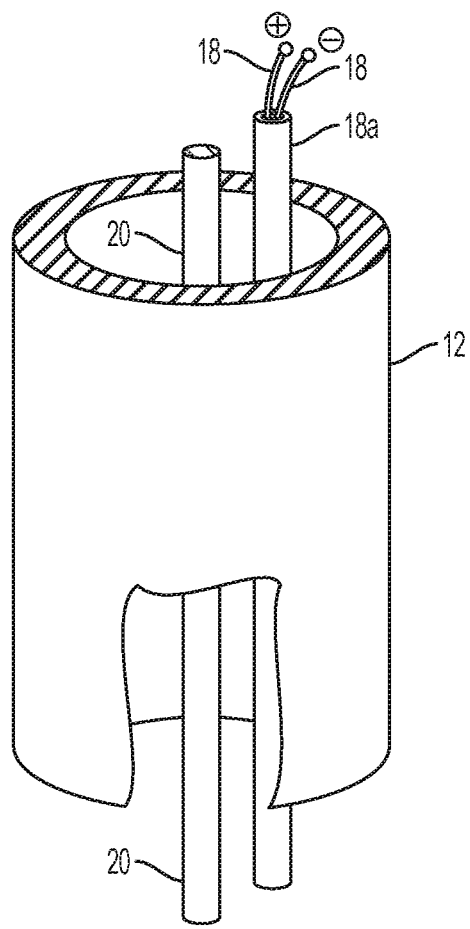
FIG. 2 shows a cutaway perspective view of the floor lamp garden hose exterior body with an interior support member and electrical wires.

Referring now to FIG. 2, the garden hose exterior body 12 is shown. An interior vertical support element 20 is also shown inside the garden hose exterior body 12 along with a pair of electrical wires 18 which may be protected by the electrical wire cover 18a. This view discloses how to look at FIG. 1 such that the inside of the garden hose exterior body 12 would have both an interior vertical support member 20 and the electrical wiring set up in an electrical wire cover 18a having a pair of electrical wires 18.

Figure 3:
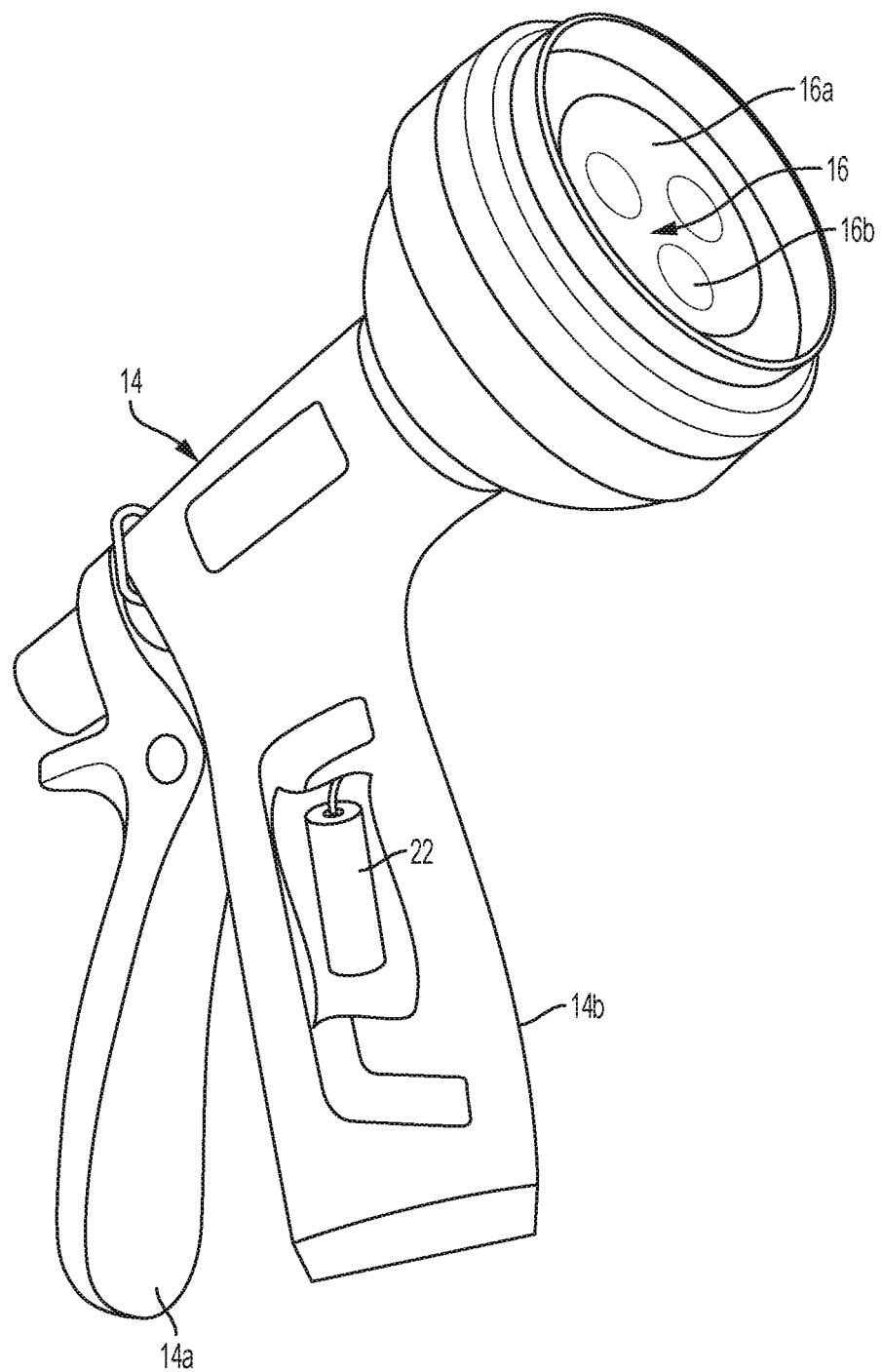
FIG. 3 shows a perspective view of the light source fixture housing that includes a cutaway showing a battery internally.

Referring now to FIG. 3, the light source fixture 14 is shown which is shaped as a garden hose water spray nozzle and includes an artificial actuator 14a and a handle 14b that could contains a battery 22 that is used to power the light source 16 having a glass or clear plastic cover 16a as a light source switch in order to turn on light source element 16b. Thus the light source 16 is conventional and wired so that light source element 16b be can be turned on and off by depressing the clear glass or plastic cover 16a which in this case is powered by a battery 22 mounted in the light source fixture 14.

Figure 4A:
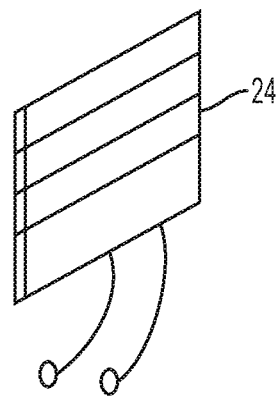
FIG. 4A shows a schematic drawing of a solar panel with two electrical wires.
Figure 4B:
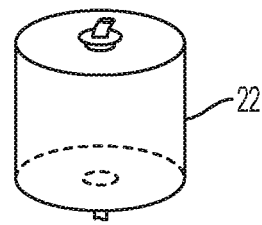
FIG. 4B shows a schematic drawing of a battery having two contacts.
Figure 4C:
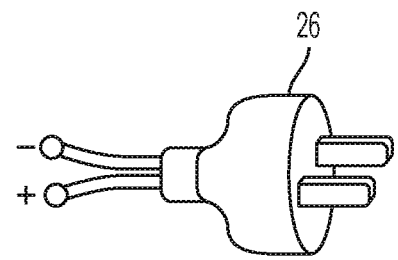
FIG. 4C shows a 120 V AC plug with two wires.

Referring now to FIG. 4A, a solar panel 24 and two wires are shown that could be used and attached to the wires 18 shown in FIG. 1 to provide solar electrical power to the light source 16. FIG. 4B shows a battery 22 that can also be used as an alternative source of power for the outdoor light and receive charge from a solar panel. FIG. 4C shows a conventional wall plug 26 and two wires that are attached to wires 18 and go to 120 V AC power unit to power the light source 16 shown in FIG. 1.

Figure 5:
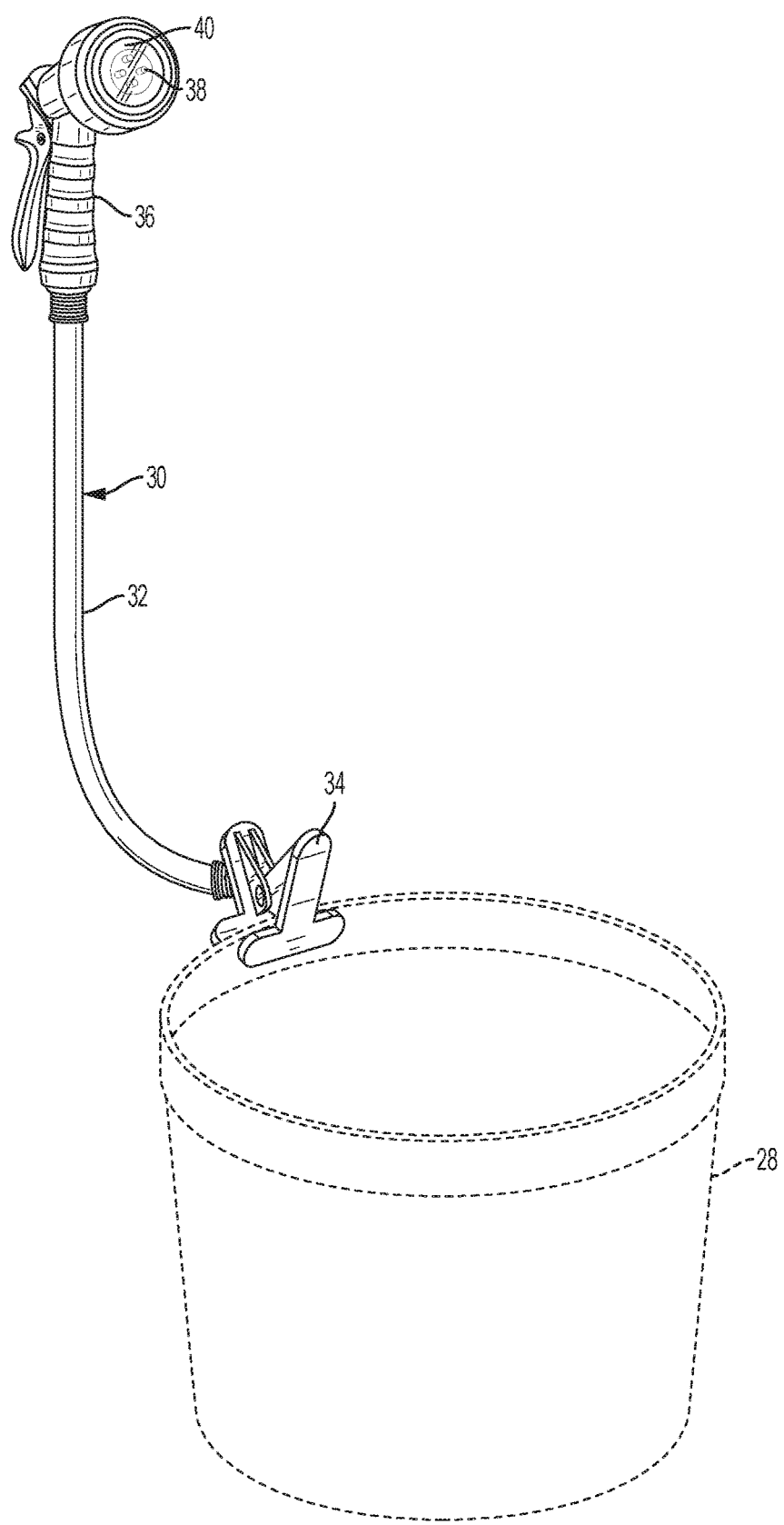
FIG. 5 is a perspective view of an alternate embodiment of the invention having a clamp attached to a conventional object such as a flower pot.

Referring now to FIG. 5, an alternate embodiment of the present invention is shown. An indoor or outdoor lamp 30 includes a garden hose-like exterior body 32 constructed of a typical garden hose material including vinyl and artificial rubber that is water resistant that has a manual clamp 34 that could be spring operated for attaching the lamp 30 to any conventional object such as a flower pot 28, indoors or outdoors. The lamp 30 has a reduced length in its exterior body 32 and is attached to a light source fixture 36, which looks like a manual water spray nozzle that also includes light source 38 and a glass or clear plastic cover 40 that also acts as an on-off switch when depressed to turn the light source 38 on and off. A battery can be utilized inside the light source fixture 36 in order to power the light source 38. The embodiment as shown in FIG. 5 can be used as a desk lamp or other indoor light or in an indoor patio type environment or outdoors attached to a conventional object such as a flower pot 28. The lamp exterior body 32 may include inside a rigid vertical support element connected between the clamp 34 and the light source fixture 36. The clamp 34 is manually squeezed by hand against spring tension to open and close the clamp 34 for securing the lamp to a conventional object.

With the present lamp that is well protected by the garden hose exterior body, a look-alike water spray nozzle that is used as the light fixture, and a light source in said fixture, the lamp 10 shown in this invention is well protected against outdoor inclement weather elements such as rain or mist, or any other type of elements that could affect the electrical system or the lighting system. The lamp can also have multiple different power sources that include conventional AC 120V, battery power, and solar power with battery solar power.

The light source can be LEDs, incandescent bulbs, or other conventional light sources.

The invention claimed is:

1. An indoor/outdoor lamp comprising:
    a lamp exterior body having a tubular housing constructed of a conventional garden hose;
    a pre-shaped rigid interior vertical support element mounted within said lamp tubular housing in a significant portion for vertically supporting and elevating the tubular housing and a pre-shaped rigid support base portion mounted inside said lamp tubular housing to support said vertical portion on a flat surface such as a floor or ground;
    a light source for emitting light;
    a light source fixture containing said light source connected to one end of said lamp body tubular housing, said light source fixture constructed as a manually actuated water spray nozzle for a garden hose;
    a pair of electrical wires;
    an electrical power source;
    said light source fixture including a pair of power wires connected to said light source electrical power source;
    a light switch;
    said light switch and said pair of electrical wires connected between said power source inside said light source fixture and said electrical power source;
    said light source fixture being water resistant.

2. An indoor/outdoor lamp as in claim 1, wherein said power source is a battery.

3. An indoor/outdoor lamp as in claim 1 wherein said power source is a solar panel.

4. An indoor/outdoor lamp as in claim 1, wherein said power source is alternating current 120 volt having a plug.

5. An indoor/outdoor lamp as in claim 1, wherein said lamp is a floor lamp.

6. An indoor/outdoor lamp as in claim 1, including a manually actuated clamp at one end for attachment of the lamp to an object.

7. An indoor/outdoor lamp as in claim 1, wherein said light source includes at least one incandescent bulb.

8. An indoor/outdoor lamp as in claim 1, wherein said light source includes at least one LED.

9. An indoor/outdoor lamp as in claim 1, wherein said light switch is attached to said light source fixture.

10. An indoor/outdoor lamp as in claim 1, wherein said light source fixture includes a transparent cover for emission of light from the light source.

* * * * *